(12) United States Patent
Renteln

(10) Patent No.: US 7,189,156 B2
(45) Date of Patent: Mar. 13, 2007

(54) STACKED POLYURETHANE POLISHING PAD AND METHOD OF PRODUCING THE SAME

(75) Inventor: Peter Renteln, San Ramon, CA (US)

(73) Assignee: JH Rhodes Company, Inc., Tempe, AZ (US)

( * ) Notice: Subject to any disclaimer, the term of this patent is extended or adjusted under 35 U.S.C. 154(b) by 171 days.

(21) Appl. No.: 10/924,834

(22) Filed: Aug. 25, 2004

(65) Prior Publication Data

US 2006/0046628 A1  Mar. 2, 2006

(51) Int. Cl.
*B24D 11/00* (2006.01)

(52) U.S. Cl. .................................................. 451/533

(58) Field of Classification Search ................ 451/526, 451/527, 528, 529, 530, 533, 534, 537, 538, 451/539
See application file for complete search history.

(56) References Cited

U.S. PATENT DOCUMENTS

| | | | |
|---|---|---|---|
| 5,212,910 A | 5/1993 | Breivogel | |
| 5,257,478 A | 11/1993 | Hyde | |
| 5,287,663 A | 2/1994 | Pierce | |
| 6,362,107 B1 | 3/2002 | Shiro | |
| 6,884,156 B2 * | 4/2005 | Prasad et al. | 451/533 |
| 2004/0055223 A1 | 3/2004 | Ono et al. | |
| 2005/0064709 A1 | 3/2005 | Shimomura et al. | |
| 2005/0221723 A1 * | 10/2005 | Duboust et al. | 451/41 |

FOREIGN PATENT DOCUMENTS

| | | |
|---|---|---|
| JP | 2000 202763 A | 7/2000 |
| WO | WO 03/043071 A | 5/2003 |

OTHER PUBLICATIONS

Patent Abstracts of Japan, vol. 2000, No. 10, Nov. 17, 2000.

* cited by examiner

*Primary Examiner*—Jacob K. Ackun, Jr.
(74) *Attorney, Agent, or Firm*—Snell & Wilmer L.L.P.

(57) ABSTRACT

A polishing pad has a sublayer; a top layer attached to the sublayer, the sublayer having a modulus of elasticity between 300 and 5000 psi and a compressibility of less than 30% at 73 psi, wherein the top pad has a modulus of elasticity which is greater than the modulus of elasticity of the sublayer and a compressibility which is smaller than a compressibility of the sublayer.

24 Claims, 2 Drawing Sheets

STACKED POLYURETHANE POLISHING PAD AND METHOD OF PRODUCING THE SAME

BACKGROUND OF THE INVENTION

The present invention relates to polyurethane pads and methods of producing the same.

The present invention generally relates to polishing pads, in particular to chemical-mechanical polishing (CMP) pads. CMP is a process step in the semiconductor fabrication sequence that has generally become an integral part of the manufacture of semiconductor wafers. The process is used in a variety of applications in the semiconductor fabrication sequence. Different applications are sometimes best optimized with different polishing pad types and configurations, however, this invention is not application specific.

In any of these CMP processes, the silicon substrate is forcibly placed in direct contact with a moving polishing pad. A wafer carrier applies pressure against the backside of the substrate, usually while simultaneously forcibly applying rotation. During this process a slurry is made available, and is generally carried between the wafer and the pad by the motion of the pad. The composition of the slurry is dictated by the specific application.

The CMP polishing pad is required to perform a plurality of engineering functions. It is required to polish, planarize up to a certain planarization length (L) determined by the quality of the silicon substrate, not planarize beyond that length, transport slurry, maintain the same friction with the wafer for wafers polished sequentially and with interruptions for hundreds of wafers, clean the wafer surface, not scratch the wafer surface, be replaceable in minimal time, and others. This invention addresses the planarization length of a pad.

L is defined as a lateral dimension characteristic of the pad's ability to planarize. Intrinsic to this concept is Preston's equation, which maintains that when polishing, the removal rate is proportional to force. There are significant deviations to this relationship, but it holds generally, and for our purpose, it is sufficient. With Preston in mind, one can consider a feature to be planarized consisting of an upraised element. (FIG. 1) A polishing pad will try to planarize the feature, and will succeed in doing so when the pressure exerted by the pad at the top of the feature exceeds the pressure exerted adjacent to the feature. Ala Preston, the removal rate at the top of the feature will exceed the removal rate adjacent to the feature and overtime the feature will decrease in height. One definition of planarization length is the distance from the feature that the pressure has increased to 1/e of the pressure infinitely far from the feature (e is ln(10)). Other definitions will also suffice for this discussion.

Both the silicon wafer and the platen offer their own sense of planarity. Silicon wafers generally exhibit small but nonzero undulations in their thickness. These undulations are on the order of 300 A and are spaced apart by a distance on the order of one centimeter. These undulations are completely unrelated to the surface features of the wafer and planarizing them generally leads to more material being removed from some spots than from other spots, an undesirable effect (FIG. 2). Additionally, it is also not desired to impose any deviations from flatness exhibited by the platen onto the wafer. Therefore, the requirement on the polishing pad related to L is that L must be as long as possible but substantially less than 1 cm. This control of L is typically achieved by use of a stacked pad, where the top pad does the polishing and the planarizing, and the bottom pad serves to decouple the platen from the top pad, and allow enough flexure to render as insignificant, pressure differences due to topography variations on the order of 300 A over a distance of 1 cm. Stacked pads have been described in U.S. Pat. No. 5,257,478 by Hyde, U.S. Pat. No. 5,212,910 by Breivogel, U.S. Pat. No. 5,287,663 by Pierce and U.S. Pat. No. 6,362,107 by Shiro.

A bottom pad typically utilized to achieve these results is the Suba IV from Rodel. Such a pad is very soft and serves the purpose of decoupling the platen from the upper pad. As suggested by U.S. Pat. No. 5,257,478 by Hyde, et al., an ideal value for this bottom pad is <250 psi. Further, the bottom pad should be resilient or elastic. A schematic diagram indicates the subpad achieving this objective. (FIG. 3).

An additional engineering requirement of the base pad is that it remain elastic throughout its life, and uniformly elastic at least everywhere under the wafer track. For example, since water is a natural component of all CMP processes, both the top and bottom pad must not change their flexural modulus in the presence of water. Additionally, since the CMP process involves the use of pressure, the pads must not exhibit a significantly inelastic component. Under pressure, an inelastic material will undergo permanent deformation. If either the subpad or the top pad undergo significant permanent deformation, a degradation of the performance of the pad could result. This could happen for a plurality of reasons of which we consider two: 1) A permanent deformation can change the elastic modulus of the material, putting it in an undesirable range; and 2) a non-uniform change in the elastic modulus can change the uniformity of the removal on a wafer, also highly undesirable. Therefore the pad must exhibit primarily elastic behavior.

So while the sublayer performs a supporting function and the top layer performs a working function, their parameters relative to one another have to be selected very carefully to achieve the above identified results. It is believed that the existing multi-layer polyurethane pads can be further improved in this sense.

SUMMARY OF THE INVENTION

Accordingly, it is an object of the present invention to provide a polyurethane polishing pad and a method of making the same, which constitutes further improvements of the existing solutions.

Another object of the invention is to provide an improved composite polishing pad which includes layers of material, each having a different flexural modulus.

A further object of the invention is to provide an improved polishing pad which includes a bottom layer which is primarily elastic in behavior.

In keeping with these objects and with others which will become apparent hereinafter, one feature of the present invention resides, briefly stated, in a polishing pad which has a sublayer and a top layer attached to said sub layer, wherein the sublayer has a modulus of elasticity between 300 psi and 5,000 psi and a compressibility less than 30% at 73 psi, (4.1% at 10 psi assuming linearity) while the top layer which contains a polishing surface, has a greater Modulus of Elasticity and a lower compressibility than the sub layer.

In accordance with one embodiment of the present invention, the top layer has a Modulus of Elasticity between 5,000 and 160,000 psi and a compressibility less than 12% at 73 psi.

When the polyethane polishing pad is designed in accordance with the present invention, it provides for highly advantageous results in that it produces a uniform material removal rate, and in particular a uniform removal rate of a material of a semiconductor wafer without planarizing of the wafer substrate.

It would appear that the value of compressibility of the sublayer considered ideal is in contradistinction to the value considered ideal in Hyde, described above. This is indeed the case. While it has been traditionally thought that the sublayer must be extremely soft, this has led to some utilization of sublayers of inappropriate material, which may absorb water resulting in a nonuniform modulus. It is a critical aspect of this invention that the modulus can be in the range offered, allowing the use of more ideal materials, while still satisfying all the engineering requirements imposed on the subpad. So while there exists a compressibility below which the sublayer will cease to satisfy these engineering requirements, the range of compressibilities greatly exceeds that range set forth in Hyde.

It is understood that the pads of this invention can be used for application of process on any of a number of substrates, such as a bare silicon wafer, a semiconductor device wafer, a magnetic memory disk or similar.

Pads of the present invention can be made by any one of a number of polymer processing methods, such as but not limited to, casting, compression, injection molding, extruding, web-coating, extruding, and sintering. The pads may be single phase or multiphase, where the second phase could include polymeric microballoons, gases or fluids. The second phase could also by an abrasive such as silica, alumina, calcium carbonate, ceria, titania, germanium, diamond, silicon carbide or combinations thereof.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
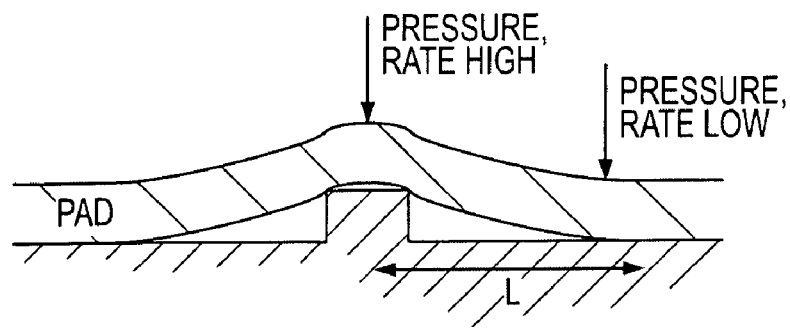
FIG. 1 is a view showing a pressure applied by a polishing pad to a feature on a semiconductor wafer.
Figure 2:
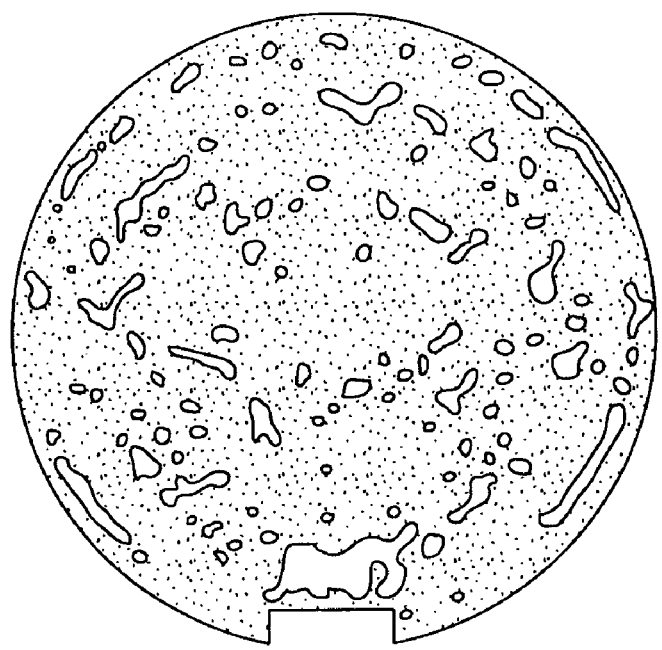
FIG. 2 is a view showing a wafer thickness map post polish on a pad which exhibited in total a Flexural Modulus which was too high.
Figure 3:
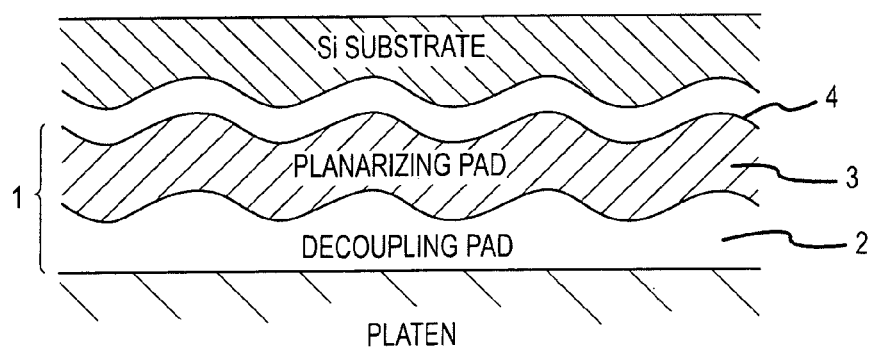
FIG. 3 is a schematic view of the stacked pad in which the subpad is successfully decoupling the top pad from the platen, enabling a uniform distribution of pressure across the wafer.

A polyurethane pad in accordance with the present invention is identified as a whole with reference numeral 1. It has a sublayer which is identified with reference numeral 2, and a top layer which is attached to the sublayer and identified with reference numeral 3. A polishing surface 4 of the polyurethane pad is provided on the top layer of the pad.

In accordance with the present invention, the sublayer 2 has a modulus of elasticity between 300 psi and 5000 psi and a preferred range of 1500 psi to 3500 psi. The compressibility of the sublayer of the polyurethane polishing pad in accordance with the present invention is less than 30% at 73 psi with a preferred range of 5% to 15% at 73 psi. The top layer 3 of the polyurethane polishing pad in accordance with the present invention has a modulus of elasticity which is greater than the modulus of elasticity of the sublayer, and at the same time has a compressibility which is smaller than the compressibility of the sublayer.

In accordance with an embodiment of the present invention, the top layer 3 can have a modulus of elasticity between 5,000 psi and 160,000 psi with a preferred range of 40,000 psi to 100,000 psi and a compressibility of less than 12% at 73 psi, with a preferred range of 4% to 10% at 73 psi.

It has been found in an unexpected and unobvious manner, that when the multi-layer polyurethane polishing pad is designed in accordance with the present invention, it provides for highly advantageous results. With the lesser modulus sublayer and a higher modulus top layer, and simultaneously with the more compressible sublayer and the less compressible top layer, in particular within the limits of these parameters in accordance with the present invention, a uniform rate of material removal, an absence of nanotopography, and an uncompromised planarization of the wafer surface offered by the top layer are provided. Further, these desirable engineering properties are provided in a range more conducively supplied by engineering materials such as closed cell foam urethanes, which more easily resist water penetration and permanent deformation.

It has been found that if the sublayer and the top layer are designed in accordance with the parameters which are different than the parameters provided for the inventive polyurethane polishing pad, the quality of the polishing is reduced, in particular the above mentioned parameters of the polishing process.

It will be understood that each of the elements described above, or two or more together, may also find a useful application in other types of constructions differing from the types described above.

While the invention has been illustrated and described as embodied in polyurethane polishing pad and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A polishing pad, comprising a sublayer; a top layer attached to said sublayer, said sublayer having a modulus of elasticity between 300 psi and 5000 psi and a compressibility of less than 30% at 73 psi, wherein said top layer has a modulus of elasticity which is greater than the modulus of elasticity of said sublayer and a compressibility which is smaller than a compressibility of said sublayer.

2. A pad as defined in claim 1, wherein said top layer has a modulus of elasticity from 5,000 psi to 160,000 psi and a compressibility of less than 12% at 73 psi.

3. A pad according to claim 1, wherein said sublayer is a polyurethane.

4. A pad according to claim 1, wherein said sublayer is an acrylic polymer.

5. A pad according to claim 1 wherein said sublayer is a polyester.

6. A pad according to claim 1 wherein said sublayer is a polyether or a polyester polyurethane.

7. A pad according to claim 1, wherein said sublayer is a polycarbonate.

8. A pad according to claim 1, wherein said top layer contains abrasive particles selected from any of silica, alumina, ceria, titania, diamond and silicon carbide.

9. A pad according to claim 1, wherein said top layer includes a filler.

10. A pad according to claim 1, wherein said sublayer includes a filler.

11. A pad according to claim 1, wherein said sublayer is a nylon.

12. A pad according to claim 1, wherein said top layer is absent abrasive particles.

13. A polishing pad, comprising a sublayer; a top layer attached to said sublayer, said sublayer having a modulus of elasticity between 1500 psi and 3500 psi and a compressibility of between 5% and 15% at 73 psi, wherein said top layer has a modulus of elasticity which is greater than the modulus of elasticity of said sublayer and a compressibility which is smaller than a compressibility of said sublayer.

14. A pad as defined in claim 1, wherein said top layer has a modulus of elasticity from 40,000 psi to 100,000 psi and a compressibility of between 4% and 10% at 73 psi.

15. A pad according to claim 13, wherein said sublayer is a polyurethane.

16. A pad according to claim 13, wherein said sublayer is an acrylic polymer.

17. A pad according to claim 13, wherein said sublayer is a polyester.

18. A pad according to claim 13, wherein said sublayer is a polyether or a polyester polyurethane.

19. A pad according to claim 13, wherein said sublayer is a polycarbonate.

20. A pad according to claim 13, wherein said top layer contains abrasive particles selected from any of silica, alumina, ceria, titania, diamond and silicon carbide.

21. A pad according to claim 13, wherein said top layer includes a filler.

22. A pad according to claim 13, wherein said sublayer includes a filler.

23. A pad according to claim 13, wherein said sublayer is a nylon.

24. A pad according to claim 13, wherein said top layer is absent abrasive particles.

* * * * *